United States Patent [19]

Matthews et al.

[11] Patent Number: 4,879,053

[45] Date of Patent: Nov. 7, 1989

[54] PROCESS FOR PREPARING OVERBASED CALCIUM SULFONATES

[75] Inventors: Leonard A. Matthews; William J. Powers, III, both of Port Arthur, Tex.; Henry M. Przybyla; Joanne R. Whittle, both of, Los Angeles, Calif.; Jerry C. Perciful, St. Genese, Belgium

[73] Assignee: Texaco Inc., White Plains, N.Y.

[21] Appl. No.: 217,540

[22] Filed: Jul. 11, 1988

[51] Int. Cl.$^4$ ............................................. C10M 135/10
[52] U.S. Cl. .......................................... 252/25; 252/18; 252/33; 252/33.4
[58] Field of Search ...................... 252/33, 18, 25, 334

[56] References Cited

U.S. PATENT DOCUMENTS

| | | | |
|---|---|---|---|
| 4,604,219 | 8/1986 | Whittle | 252/33 |
| 4,698,170 | 10/1987 | Le Coent | 252/33.2 |
| 4,780,224 | 10/1988 | Tze-Chi Jao | 252/33 |
| 4,810,396 | 3/1989 | Tze-Chi Jao et al. | 252/33 |

*Primary Examiner*—Jacqueline V. Howard
*Attorney, Agent, or Firm*—Jack H. Park; Kenneth R. Priem; Richard A. Morgan

[57] ABSTRACT

In the preparation of an overbased calcium sulfonate from a chloride free calcium sulfonate and calcium oxide, it has been found that 0.4 to 0.9 wt % calcium chloride improves the overbasing reaction rate.

7 Claims, No Drawings

PROCESS FOR PREPARING OVERBASED CALCIUM SULFONATES

BACKGROUND OF THE INVENTION

This invention is an improved process for preparing overbased calcium sulfonates which are used as detergent and reserve alkalinity lubricating oil additives.

DESCRIPTION OF OTHER RELEVANT METHODS IN THE FIELD

In the course of operation, internal combustion engines convert lubricating oil to acidic degradation products. Those acidic degradation products attack and corrode engine parts and catalyze the formation of sludge, thereby reducing lubricity and accelerating wear of moving parts in contact with the lubrication oil.

It is desirable to add basic substances to the lubricating oil which neutralize acids as they are formed in the engine before they reach concentrations sufficient to cause corrosion or to catalyze the sludge reaction. Adding an alkalinity agent to the detergent in motor oil is known as overbasing. Colloidal carbonates of the alkaline earth metals have been found to be well suited for this purpose. These carbonate dispersions are stabilized by oil soluble surface active agents such as the sulfonates of the alkaline earth metals in which the sulfonic acid portion of the molecule has a molecular weight of preferably 450 to 600. The sulfonates are made by sulfonation of lubricating oil fractions from petroleum and by sulfonation of an alkylaryl such as an alkylbenzene having the desired molecular weight for this purpose. Benzene alkylates with straight chain alkyl groups are especially desirable.

In general the process of preparing overbased calcium sulfonates comprises reacting a solution of a naturally occurring or synthetic alkylbenzene sulfonic acids having a molecular weight greater than 400, in oil with calcium oxide or hydroxide and bubbling carbon dioxide through the reaction mixture; thereby incorporating an excess of calcium carbonate into the calcium sulfonate which confers reserve alkalinity to the product.

U. S. Pat. No. 4,427,559 to J. R. Whittle teaches that a mixture of calcium oxide and calcium hydroxide can be used in the overbasing reaction to provide reserve alkalinity to neutral calcium sulfonates. It is reported that when mixtures containing up to 30% CaO are used, satisfactory products were obtained. When mixtures of 30 to 50% CaO were used, a gelatinous material which plugged the filter was obtained. Concentrations of CaO above 70% produced a fluid product containing finely divided light reflective particles which could not be filtered. In this regard the patent teaches the criticality of the ratio of the calcium oxide to calcium hydroxide in the absence of a promoter in producing acceptable products.

U. S. Pat. No. 4,604,219 to J. R. Whittle teaches that calcium oxide may be used as the sole reserve alkalinity source in overbasing calcium sulfonates. This patent teaches that in the absence of a promoter, water addition rate is critical to produce a low solids content, filterable product.

U. S. Pat. No. 4,086,170 to De Clippeleir et al. teaches overbased calcium sulfonates are prepared by reacting a solution of alkylbenzene sulfonic acids with an excess of a calcium oxide having a medium or low activity toward water and with carbon dioxide. The calcium oxide is the sole inorganic calcium source. Improved overbasing and filterability of the overbased sulfonate solution were obtained by the use of a promoter for the conversion of the calcium oxide to calcium hydroxide. Recommended promoters include ammonia or inorganic bases such as monoamines or diamines, e.g. ethylene diamine.

Use of calcium chloride as a promoter for the neutralization of sulfonic acid solutions with basic calcium compounds such as calcium hydroxide is known. Examples of this teaching can be found, for instance in Example 39 of U. S. Pat. No. 4,468,339 to Rysek et al. and in Example 19 of U. S. Pat. No. 4,582,543 to Bretz. Use of calcium chloride to cause metathesis of a salt of a sulfonic acid to the calcium form is taught in, for example, Example 5 of U. S. Pat. No. 4,615,813, also to Bretz. In these cases, further processing was conducted to introduce an alkaline reserve by overbasing via carbonation of calcium hydroxide. As is demonstrated by Examples 5 and 6 of this patent, use or omission of calcium chloride in overbasing via carbonation of calcium hydroxide did not alter the process or the product formed.

U. S. Pat. No. 4,443,577 to Higgins et al. teaches coatings containing calcium sulfonates, e.g. Examples 6, 14 and 16.

SUMMARY OF THE INVENTION

The invention is an improved process for producing an overbased calcium sulfonate. Chloride free calcium sulfonate derived from sulfonating a naturally occurring or synthetic alkylaryl, such as an alkylbenzene, with oleum or sulfur trioxide are overbased by conversion to a neutral calcium salt, by diluting with a light hydrocarbon solvent and a lower alkanol. Then calcium oxide and 0.1 to 1 wt % calcium chloride is mixed with the diluted calcium sulfonate. The resulting mixture is heated to about 100° F. to 170° F. at a pressure of about 1 to 5 atm. Carbon dioxide is introduced into the heated mixture in an amount sufficient to provide a molar ratio of $CO_2$/calcium oxide of about 0.1 to 1.2. The mixture is worked up and an overbased calcium sulfonate recovered.

DESCRIPTION OF THE PREFERRED EMBODIMENTS

We have discovered that when calcium oxide is used as the major proportion of inorganic calcium in the overbasing of a neutral calcium sulfonate that it is advantageous to incorporate 0.1 to 1 wt %, preferably 0.4 to 0.9 wt % of an alkali or alkaline earth halide, preferably a chloride to promote the calcium oxide.

Commercially available calcium sulfonates produced by methathesis contain small amounts of chlorides or other materials which promote calcium oxide overbasing. Applicants have found from X-ray analysis, that commercially available neutral calcium sulfonates produced by the direct contacting of a natural or synthetic alkylbenzene or other alkylaryl with oleum or gaseous sulfur trioxide (sulfuric anhydride) followed by neutralization do not contain sufficient amounts of calcium oxide promoting components. Accordingly, the overbasing reaction with calcium oxide alone or calcium oxide in major proportion and calcium hydroxide in minor proportion is enhanced by the incorporation of an effective amount of a chloride salt such as calcium chloride. Production, neutralization and purification of these neutral calcium sulfonates by the direct method is described in U. S. Pat. No. 4,086,170 to De Clippeleir et al. incorporated herein by reference.

Amounts of promoter below 0.1 wt % are ineffective to promote the reaction. Amounts above 1 wt % are corrosive in the final product and hence to be avoided. Applicants have found that 0.4 to 0.9 wt % calcium chloride is preferred for product quality and economy of materials.

The operating parameters of the present process are tabulated in Table I.

TABLE I

| Variable | Operable Range | Preferred Range |
| --- | --- | --- |
| 1. Reaction Temperature | 100–170° F. | 130–150° F. |
| 2. Pressure | 1–5 atm. | 1–2.5 atm. |
| 3. Mole ratio $H_2O/CaO$ | 0–1.2 | 0.4–0.8 |
| 4. Mole ratio $CO_2/CaO$ | 0.1–1.2 | 0.6–0.9 |
| 5. Hydrocarbon Solvent | 37–50 wt % | 40–50 wt % |
| 6. Alcohol | 4.7–7.2 wt % | 4.8–5.8 wt % |
| 7. Carbonation and Hydration Time | 60–240 min. | 60–180 min. |

Examples of useful and preferred reactants which may be employed in the practice of the invention are listed in Table II.

TABLE II

| Reactants | Example | Preferred Reactants |
| --- | --- | --- |
| 1. Calcium Oxide | | One with a total slaking time of 4.5–35 minutes and a temperature rise of 6° C. max in the first 30 sec. as measured by ASTM C-100-76a. |
| 2. Calcium Sulfonate | Neutralized sulfonic acid derived from a natural feedstock. Neutralized sulfonic acid derived from a synthetic feedstock. Blends of neutralized sulfonic acids from natural and synthetic feedstocks all produced by the direct contact of oleum or sulfur trioxide (chloride free). | Blends of neutralized sulfonic acids from natural and synthetic feedstocks. |
| 3. Diluent Oil | 100–500 SUS (@ 40° C.) pale stock. 100–500 SUS solvent neutral oil. | 100 SUS pale stock hydro-finished |
| 4. Hydrocarbon Solvent | Straight run gasoline, dehexanized raffinate gasoline, normal or mixed hexanes, normal or mixed heptanes, benzene or toluene. | Crude heptane |
| 5. Lower alcohols | $C_1$–$C_5$ normal or branched chain alcohols. | Methanol |

This invention is better shown by way of example.

We have discovered that in the case of certain neutral calcium sulfonates prepared via the direct neutralization of sulfonic acids using calcium oxide or mixtures of calcium oxide and calcuim hydroxide, small amounts of calcium chloride were useful as reaction promoters for the overbasing step in calcium oxide overbasing processes. Neutral calcium sulfonates prepared via metathetical conversion of the sodium sulfonates using calcium chloride did not require a promoter. We have found these materials normally contain 0.2 to 0.3 wt % chlorine as determined by X-ray analysis. The efficiency of the promoter is demonstrated by the following examples of the preparation of overbased calcium sulfonates using a mixture of calcium oxide and calcium hydroxide as the source of overbasing calcium.

EXAMPLE

Neutral Calcium Sulfonate A was Witco Calcinate T prepared via a metathetical route. Neutral Calcium Sulfonate B was Witco Calcinate T-2 prepared via direct neutralization of a calcium sulfonic acid with a calcium base.

COMPARATIVE EXAMPLE 1

A ten gallon stainless steel reaction kettle equipped with a turbine agitator and gas ring sparger was charged with the following ingredients:

Neutral Calcium Sulfonate A: 21.8 lb.
Light Naphtha: 25.1 lb.
Calcium Oxide: 2.9 lb.
Calcium Hydroxide: 2.5 lb.
Methanol: 4.3 lb.

The temperature was adjusted to about 140° F., and 3.0 lbs of carbon dioxide was introduced to the stirred reaction mass over a three hour period. After solids separation and solvent recovery, the crude reaction mass yielded an overbased calcium sulfonate with a total base number (TBN) of 296 and an overbasing ratio (OBR) of 8.4.

COMPARATIVE EXAMPLE 2

The procedure in Example 1 was repeated except that Neutral Calcium Sulfonate B was used in place of Neutral Calcium Sulfonate A. The product exhibited a TBN of 57 and an OBR of 1.1. This procedure was repeated and results were a TBN of 71 and an OBR of 1.6.

EXAMPLE 3

The procedure of Example 2 was repeated except 0.07 lbs of calcium chloride was included in the initial reactor charge. The isolated overbased sulfonate product had a TBN of 300 and an OBR of 7.9.

EXAMPLE 4

The procedure of Example 2 was repeated except 0.03 lbs of calcium chloride was included in the initial reactor charge. The isolated overbased sulfonate product had a TBN of 302 and an OBR of 8.6.

The promotion of calcium chloride in this Example is distinguished from uses of calcium chloride in U. S. Pat. Nos. 4,615,813 and 4,582,543, where calcium chloride is included in the preparation of the neutral calcium sulfonate via calcium hydroxide neutralization of a sulfonic acid with the neutral sulfonates overbased using calcium hydroxide as the source of overbasing calcium.

COMPARATIVE EXAMPLE 5

A 80 gallon stainless steel reaction kettle equipped with a turbine agitator and gas ring sparger was charged with the following ingredients:
Neutral Calcium Sulfonate A: 138.0 lb.
Light Naphtha: 199.0 lb.
Calcium Hydroxide: 120.0 lb.
Methanol: 38.0 lb.

The temperature was adjusted to about 140° F., and 55.7 lbs of carbon dioxide was introduced to the stirred reaction mass over a 3 hour period. On completion of this carbonation step, 50.0 lbs of a light lubricating oil was added as a diluent. After solids separation and solvent recovery, the crude reaction mass yielded an overbased calcium sulfonate with a TBN of 396 and an OBR of 18.7.

COMPARATIVE EXAMPLE 6

The procedure of Example 5 was repeated except that Neutral Calcium Sulfonate B was used in place of Neutral Calcium Sulfonate A. The product had a TBN of 414 and an OBR of 20.9.

Examples 5 and 6 demonstrate there is no advantage in using a promoter in combination with calcium hydroxide.

In the following examples, the usefulness of our technique when applied to oxide-based overbasing processes, such as that disclosed in U. S. Pat. No. 4,604,219, is demonstrated.

EXAMPLE 7

A 10 gallon stainless steel reaction kettle equipped with a turbine agitator and gas ring sparger was charged with the following ingredients:
Neutral Calcium Sulfonate A: 11.3 lb.
Light Naphtha: 32.7 lb.
Calcium Oxide: 6.3 lb.
Methanol: 3.8 lb.

The temperature was adjusted to about 105° F., and 3.8 lbs of carbon dioxide and 1.41 lbs of water were introduced to the stirred reaction mass over a 3 hour period. The carbon dioxide was introduced using the sparger and the water added in the liquid phase. During this three hour period, the exothermic reactions taking place raised the temperature of the reaction mass from about 105° F. to 140°-145° F. Following the addition of carbon dioxide and water, the reaction mass temperature was raised to about 150° F. and a two-phase overhead collected for a period of 2.5 hours. The hydrocarbon phase was returned to the reactor and the alcohol, water phase discarded. A light lubricating oil, 5.6 lbs, was introduced as a diluent. The crude reaction mass, after solids separation and solvent recovery, yielded an overbased calcium sulfonate exhibiting a TBN of 434 and an OBR of 20.4.

EXAMPLE 8

The procedure of Example 7 was repeated except that Neutral Calcium Sulfonate B was used in place of Neutral Calcium Sulfonate A. The product exhibited a TBN of 116 and an OBR of 3.8.

EXAMPLE 9

Example 8 was repeated except that 0.04 lbs of calcium chloride was included in the initial reactor charge. The overbased sulfonate product had a TBN of 400 and an OBR of 19.1.

The Examples demonstrate that in the overbasing reaction using calcium oxide as the source of inorganic calcium, calcium chloride promotes commercially acceptable reaction rates.

GLOSSARY $$OBR\text{—Overbasing Ratio} = \frac{\text{moles dispersed inorganic calcium}}{\text{moles calcium sulfonate}}$$

$$TBN\text{—Total Base Number} = \frac{\text{milligrams KOH}}{\text{gram sample}}$$

TBN; ranging from 0 to 400, is the measure of the overbasing of 10 to 40 wt % calcium sulfonate with 0 to 50 wt % CaO, Ca(OH)$_2$, CaCO$_3$ or mixture thereof. It is a measure of reserve alkalinity.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. A process for preparing an overbased calcium sulfonate comprising the steps of:
    (a) diluting a neutral, calcium sulfonate with a light hydrocarbon solvent and a lower alkanol, said calcium sulfonate derived from sulfonating a naturally occurring or synthetic alkylaryl with oleum or sulfur trioxide and recovering chloride free sulfonate;
    (b) mixing calcium oxide and 0.1 to 1 wt % of a promoter selected from the group consisting of alkali halides and alkaline earth halides with the diluted calcium sulfonate;
    (c) heating the resulting mixture to about 100° F. to 170° F. at a pressure of about 1 to 5 atm;
    (d) introducing into the heated mixture, gaseous carbon dioxide in an amount sufficient to provide a molar ratio of CO$_2$/calcium oxide of about 0.1 to 1.2;
    (e) adding a diluent oil;
    (f) separating solids from the liquid; and
    (g) stripping the solvent from the resulting liquid product.

2. The process of claim 1 wherein the promoter is in an amount of 0.4 to 0.9 wt %.

3. The process of claim 1 wherein halide is chloride.

4. The process of claim 1 wherein the calcium oxide is mixed with a minor proportion of calcium hydroxide.

5. A process for preparing an overbased calcium sulfonate comprising the steps of:
    (a) diluting a neutral, calcium sulfonate with a light hydrocarbon solvent and a lower alkanol, said calcium sulfonate derived from sulfonating a naturally occurring or synthetic alkylaryl with oleum or sulfur trioxide and recovering a chloride free sulfonate;

(b) mixing calcium oxide and 0.1 to 1 wt % calcium chloride with the diluted calcium sulfonate;

(c) heating the resulting mixture to about 100.F to 170° F. at a pressure of about 1 to 5 atm;

(d) introducing into the heated mixture, gaseous carbon dioxide in an amount sufficient to provide a molar ratio of $CO_2$/calcium oxide of about 0.1 to 1.2;

(e) adding a diluent oil;

(f) separating solids from the liquid; and (g) stripping the solvent from the resulting liquid product.

6. The process of claim 5 wherein the calcium chloride is in an amount of 0.4 to 0.9 wt %.

7. The process of claim 5 wherein the calcium oxide is mixed with a minor proportion of calcium hydroxide.

* * * * *

UNITED STATES PATENT AND TRADEMARK OFFICE
CERTIFICATE OF CORRECTION

PATENT NO. : 4,879,053

DATED : November 7, 1989

INVENTOR(S) : Leonard Anthony Matthews, William Joseph Powers, III, Joanne Rose Whittle and Jerry Cecil Perciful It is certified that error appears in the above-identified patent and that said Letters Patent is hereby corrected as shown below:

Claim 5, Col. 7, Line 5, delete "100.F" and substitute therefor --100°F--.

In [75] Inventors, delete "Henry M. Przybyla".

In [75] Inventors, delete "both of, Los Angeles, Calif." and insert therefor --deceased--.

Signed and Sealed this

Twentieth Day of November, 1990

Attest:

HARRY F. MANBECK, JR.

*Attesting Officer*  *Commissioner of Patents and Trademarks*